United States Patent
Huang

(10) Patent No.: US 6,669,513 B2
(45) Date of Patent: Dec. 30, 2003

(54) MULTIPURPOSE COMBINATION USB HUB AND POWER ADAPTER ASSEMBLY

(76) Inventor: Yes Yen Huang, No. 12, Alley 70, Sec. 1, Chung Hua Road, Tocheng City, Taipei Hsien (TW)

( * ) Notice: Subject to any disclaimer, the term of this patent is extended or adjusted under 35 U.S.C. 154(b) by 0 days.

(21) Appl. No.: 10/198,147

(22) Filed: Jul. 19, 2002

(65) Prior Publication Data

US 2003/0216069 A1 Nov. 20, 2003

(30) Foreign Application Priority Data

May 14, 2002 (TW) .......................................... 091206802

(51) Int. Cl.⁷ ...................... H01R 25/00; H01R 27/00; H05K 5/00
(52) U.S. Cl. ...................................... 439/638; 361/686
(58) Field of Search .............................. 439/105, 638, 439/939, 949; 361/686, 683

(56) References Cited

U.S. PATENT DOCUMENTS

| 6,141,221 A | * | 10/2000 | Tong et al. ................. 361/724 |
| 6,327,143 B1 | * | 12/2001 | Bonstrom et al. .......... 361/683 |
| 6,424,525 B1 | * | 7/2002 | MacLeod et al. ........... 361/686 |
| 2003/0135681 A1 | * | 7/2003 | Laity et al. ................. 710/303 |

* cited by examiner

Primary Examiner—Michael C. Zarroli
(74) Attorney, Agent, or Firm—Troxell Law Office PLLC

(57) ABSTRACT

A multipurpose combination USB hub and power adapter assembly is constructed to include a hub and power adapter main unit, which is a signal input output and power adapter control center for controlling signal input and output and converting AC power into DC power of different voltages, and a plurality of connection boxes adapted for fitting into upward insertion slots to connect network apparatus to the hub and power adapter main unit.

3 Claims, 3 Drawing Sheets

MULTIPURPOSE COMBINATION USB HUB AND POWER ADAPTER ASSEMBLY

BACKGROUND OF THE INVENTION

1. Field of the Invention

The present invention relates to USB hubs and, more particularly, to a multipurpose combination USB hub and power adapter assembly.

2. Description of the Related Art

Following fast development of computer technology, a variety of computer peripheral apparatus have been developed. Further, the development of local area networks sophisticates the connection between personal computers, servers, and other network apparatus and computer peripheral apparatus. USB (Universal Serial Bus) hubs are commonly used in a network for connecting a set of computer peripheral apparatus to a host computer. Various USB hubs are known. There are known USB hubs with a USB cable and USB hubs without USB cable. However, regular USB hubs and other network apparatus do not provide power supply. When several USB hubs, switches, connectors, power adapters and other network apparatus are arranged together, the related cables may be tangled.

SUMMARY OF THE INVENTION

The present invention has been accomplished under the circumstances in view. It is the main object of the present invention to provide a multipurpose combination USB hub and power adapter assembly, which.

The multipurpose combination USB hub and power adapter assembly comprises a hub and power adapter main unit, the hub and power adapter main unit comprising an AC power input connector, a 5.0 DC power output connector and a 3.5 DC power output connector respectively disposed in a back side thereof, a power cable adapted for connecting the AC power input connector to an electric output to obtain AC power supply, a USB (universal serial bus) input connector in one lateral sidewall thereof for signal input, a set of upward insertion slots arranged in a top sidewall thereof, and a plurality of hooks respectively provided in the upward insertion slots and adapted for securing a respective connection box in the upward insertion slots, the upward insertion slots each comprising a USB output connector for signal output and a DC output connector for DC power output; and a plurality of connection boxes adapted for fitting into the upward insertion slots to connect network apparatus to the hub and power adapter main unit, the connection box each comprising a USB input connector and a DC power input connector respectively disposed in a bottom side thereof and adapted for connecting to the USB output connector and DC power output connector of one of the upward insertion slots.

DETAILED DESCRIPTION OF THE PREFERRED EMBODIMENT

Figure 1:
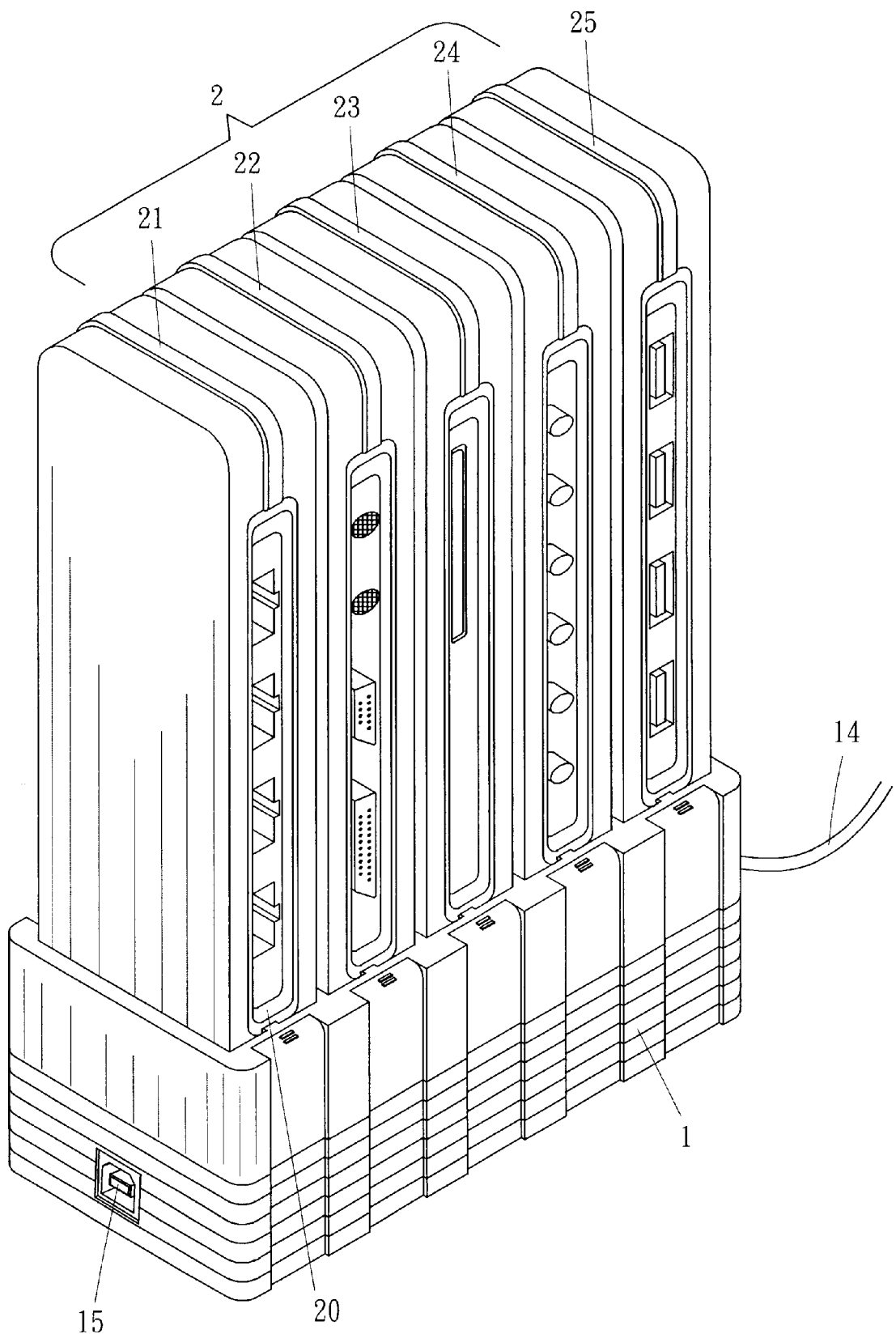
FIG. 1 is an elevational view of a multipurpose combination USB hub and power adapter assembly according to the present invention.
Figure 2:
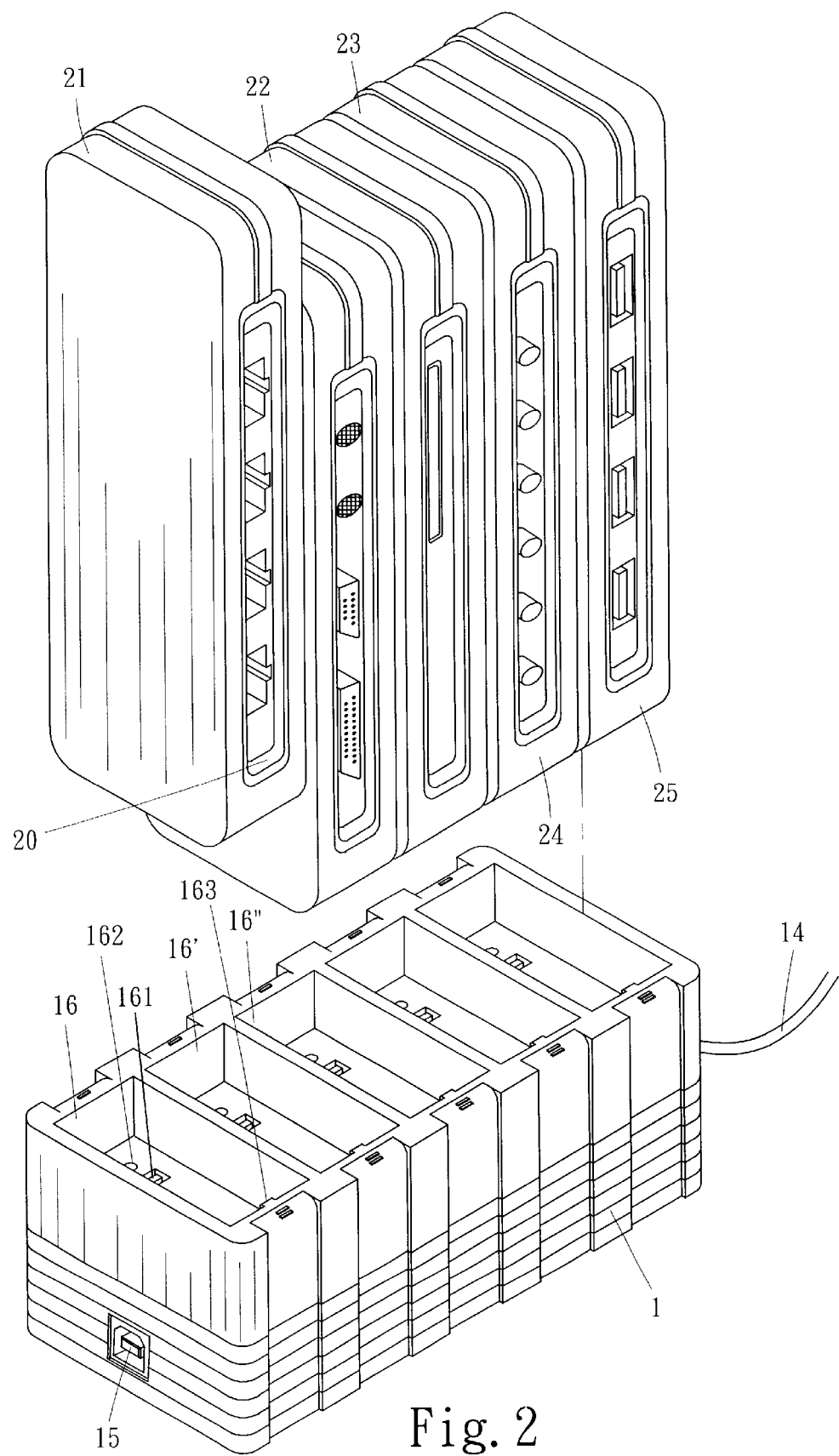
FIG. 2 is an exploded view of the multipurpose combination USB hub and power adapter assembly according to the present invention.
Figure 3:
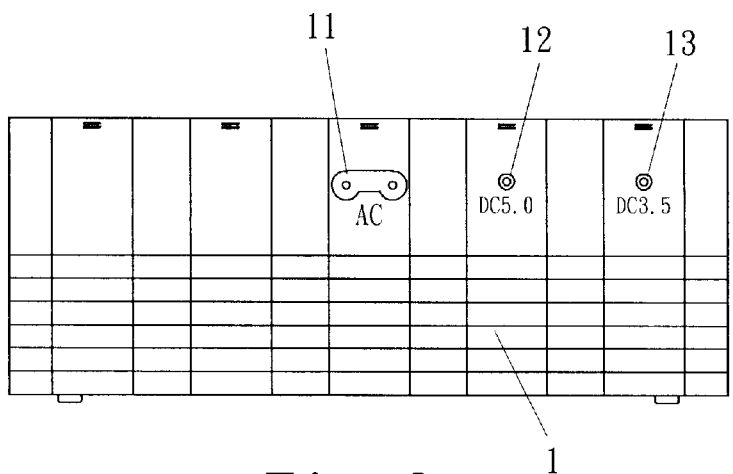
FIG. 3 is a rear side view of a hub and power adapter main unit for the multipurpose combination USB hub and power adapter assembly according to the present invention.

Referring to FIGS. 1–3, a multipurpose combination USB hub and power adapter assembly is shown comprised of a hub and power adapter main unit 1, and a plurality of connection boxes 2.

The hub and power adapter main unit 1 comprises an AC power input connector 11, a 5.0 DC power output connector 12 and a 3.5 DC power output connector 13 respectively disposed in the back side thereof. A power cable 14 is used to connect city power supply to the AC power input connector 11.

The hub and power adapter main unit 1 further comprises a USB input connector 15 in one lateral sidewall thereof, a set of upward insertion slots 16;16';16" arranged in the top sidewall thereof, and a plurality of hooks 163 respectively provided in the upward insertion slots 16;16';16" near the top. The upward insertion slots 16;16';16" each comprise a USB output connector 161 and a DC output connector 162.

Basically, the hub and power adapter main unit 1 is a signal input output and power adapter control center for controlling signal input from the USB input connector 15 and signal output through the USB output connectors 161 of the upward insertion slots 16;16';16" as well as converting AC power obtained from the AC power input connector 11 into DC power of different voltages for output through the power output connectors 12;13;162.

The connection boxes 2 include a USB Ethernet receiving box 21, a USB COMBO hub 22, a USB MP3 and card reader box 23, a USB multi-channel video processing box 24, and a 2.0 USB hub 25.

Figure 4:
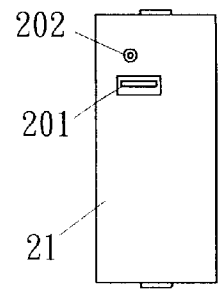
FIG. 4 is a bottom view of a connection box for the multipurpose combination USB hub and power adapter assembly according to the present invention.

Referring to FIG. 4, every connection box 2 comprises a USB input connector 201 and a DC power input connector 202 respectively disposed in the bottom side and adapted for connecting to the USB output connector 161 and DC power output connector 162 of one of the upward insertion slots 16;16';16". When one connection box 2 inserted into one upward insertion slot 16;16';16", the respective hook 163 hooks on the loaded connection box 2 in position.

Figure 5:
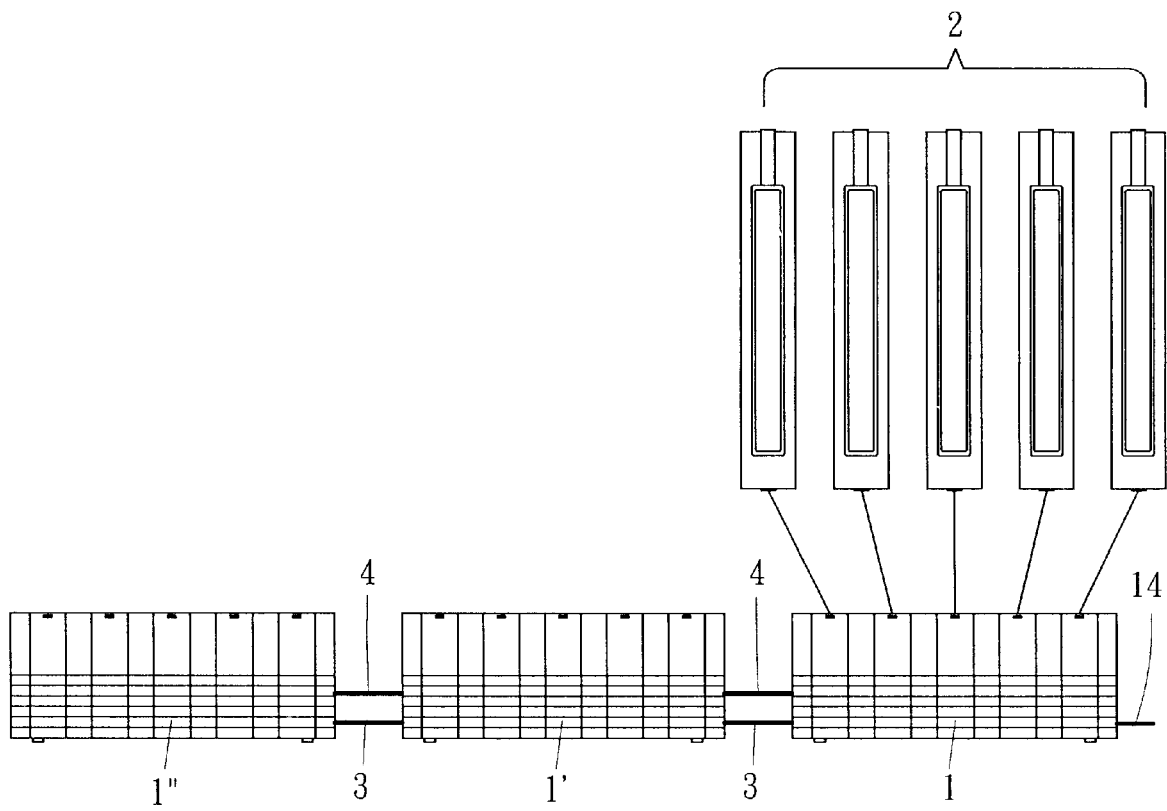
FIG. 5 is a schematic drawing showing a number of hub and power adapter main units connected in series according to the present invention.

Referring to FIG. 5, multiple hub and power adapter main units 1;1';1" may be connected in series by connection cables 3 and AC power cables 4.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A multipurpose combination USB hub and power adapter assembly comprising:

a hub and power adapter main unit, said hub and power adapter main unit comprising an AC power input connector, a 5.0 DC power output connector and a 3.5 DC power output connector respectively disposed in a back side thereof, a power cable adapted for connecting said AC power input connector to an electric output to obtain AC power supply, a USB (universal serial bus) input connector in one lateral sidewall thereof for signal input, a set of upward insertion slots arranged in a top sidewall thereof, and a plurality of hooks respectively provided in said upward insertion slots and adapted for securing a respective connection box in said upward insertion slots, said upward insertion slots each comprising a USB output connector for signal output and a DC output connector for DC power output; and a plurality of connection boxes adapted for fitting into said upward insertion slots to connect network apparatus to said hub and power adapter main unit, said connection box each comprising a USB input connector and a DC power input connector respectively disposed in a bottom side thereof and adapted for connecting to the USB output connector and DC power output connector of one of said upward insertion slots.

2. The multipurpose combination USB hub and power adapter assembly as claimed in claim 1, wherein said connection boxes include a USB Ethernet receiving box, a USB COMBO hub, a USB MP3 and card reader box, a USB multi-channel video processing box, and a 2.0 USB hub.

3. The multipurpose combination USB hub and power adapter assembly as claimed in claim 1, wherein said hub and power adapter main unit has USB signal and power connection means such that multiple hub and power adapter main units can be connected in series.

* * * * *